Oct. 28, 1924.
F. M. COOK
INDICATOR
Filed Dec. 7, 1923
1,513,158
2 Sheets-Sheet 1
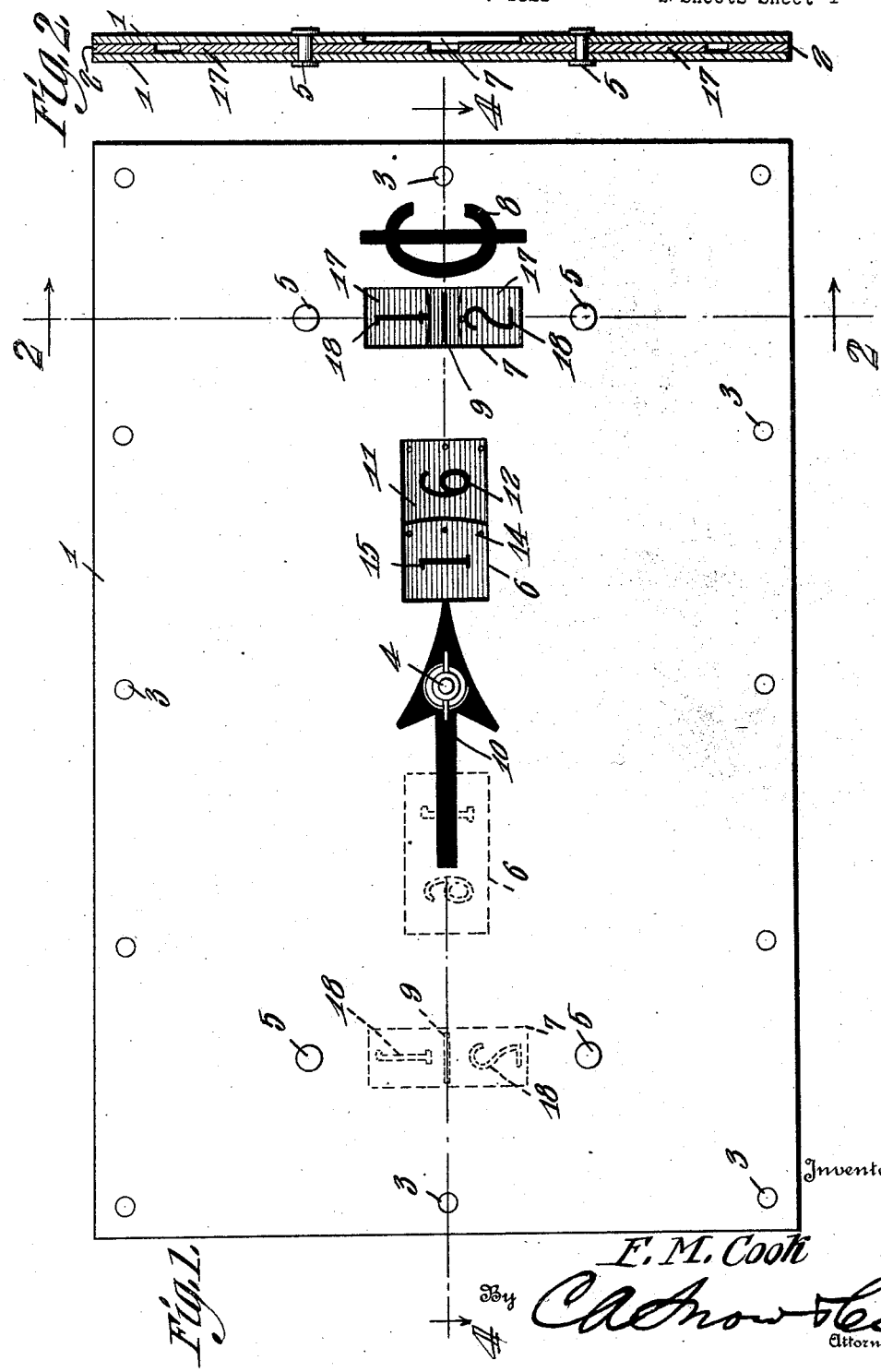

Oct. 28, 1924.
F. M. COOK
INDICATOR
Filed Dec. 7, 1923
1,513,158
2 Sheets-Sheet 2
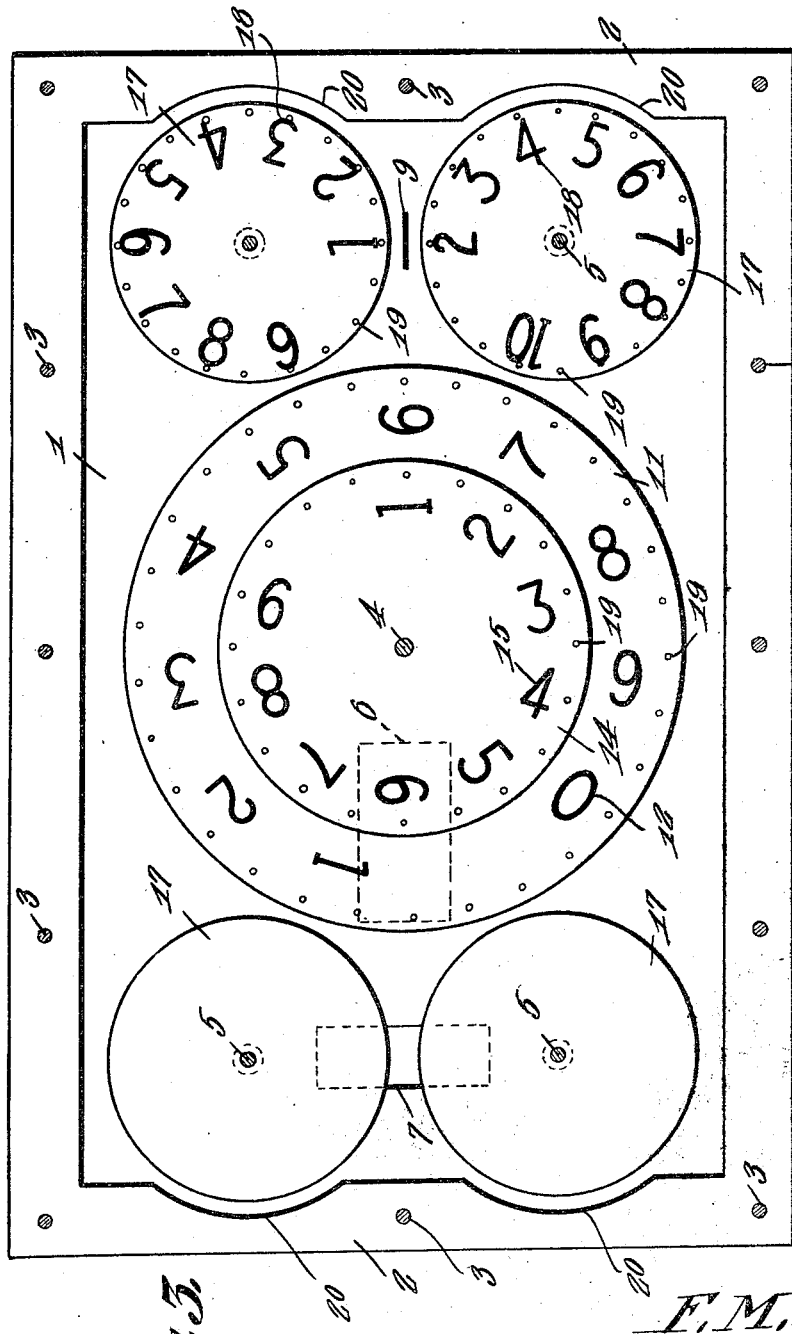
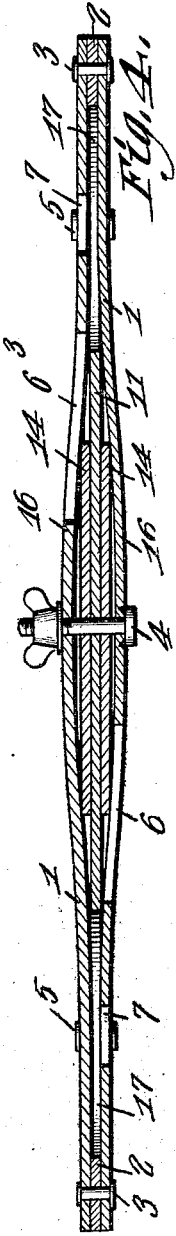
Inventor
F. M. Cook
By C. A. Snow & Co.
Attorneys Patented Oct. 28, 1924.

1,513,158

UNITED STATES PATENT OFFICE.

FRANKFORD M. COOK, OF SEDALIA, MISSOURI.

INDICATOR.

Application filed December 7, 1923. Serial No. 679,163.

*To all whom it may concern:*

Be it known that I, FRANKFORD M. COOK, a citizen of the United States, residing at Sedalia, in the county of Pettis and State of Missouri, have invented a new and useful Indicator, of which the following is a specification.

This invention aims to provide a simple device in which, through the manipulation of movable disks, the prices of merchandise may be exhibited to prospective purchasers, as the prices change, the device being of utility in the hands of vendors of gasoline and other commodities.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention shown, can be made, without departing from the spirit of the invention.

In the accompanying drawings:

Figure 1 shows in elevation, a device constructed in accordance with the invention; Figure 2 is a section on the line 2—2 of Figure 1; Figure 3 is an elevation wherein one of the outer plates has been removed; Figure 4 is a section on the line 4—4 of Figure 1.

The device forming the subject matter of this application is made of any suitable material and comprises outer plates 1 between which is located a marginal spacer 2 of rectangular outline, as shown in Figure 3, the plates 1 and the spacer 2 being held together by securing elements 3. An adjustable pivot member 4, which may be a bolt and wing nut, passes through the outer plates 1 at the geometrical center of the frame. Pairs of pivot elements 5 are mounted in the plates 1 and are located between the median transverse line of the frame and the ends thereof. Main openings 6 are formed in the outer plates 1 and are located in the median longitudinal line of the frame. The main opening 6 of one plate located on one side of the pivot member 4, and the corresponding opening in the other plate is located on the opposite side of the pivot member, as shown in Figure 1. Auxiliary openings 7 are fashioned in the plates 1, on opposite sides of the pivot member 4 and are located between the openings 6 and the ends of the frame. The openings 6 are elongated longitudinally of the frame, the openings 7 being elongated transversely of the frame. A character 8, denoting a standard of value, is inscribed on the outer surface of the plate 1, between the opening 7 and the end of the frame. On the inner surface of each plate 1 is inscribed a partition line 5. The partition line 9 on each of the plates 1 is visible through the auxiliary opening 7 in the other plate, as clearly shown in Figure 1. Each plate 1 may be provided on its outer surface, and preferably at its geometrical center, with an index 10, such as an arrow, pointing to the opening 6.

An inner disk 11 is located between the plates 1 and is mounted for rotation on the adjustable pivot member 4. The inner disk 11 is supplied on both sides, with numerals 12, visible through the openings 7, the numerals being so inscribed on the opposite surfaces of the disk 11 that the numerals may be read from either side of the frame, without inverting the frame—an observation which will be understood readily when the dot and dash showing of Figure 1 is noted. Outer disks 14 are mounted to rotate on the adjustable pivot member 4 and are located between the inner disk 11 on the one hand, and the outer plates 1 on the other hand. The outer disks 14 are of less diameter than the inner disk 11, so that the numerals 12 on the inner disk will remain exposed, through the openings 6, as indicated in Figure 1. The outer disks 14 are provided with numerals 15 on their outer surfaces, these numerals being adapted to be exposed through the openings 6. The plates 1 are bowed outwardly, as at 16, and have some resiliency. Because the plates 1 are bowed as at 16, the plates do not drag on the numerals 12 and 15 and obliterate them. By tightening the adjustable pivot member 4, the bowed portions 16 of the plates 1 may be compressed upon the outer disks 14 thereby binding the disks 14 and 11 together, so that they will not turn too freely. Fraction disks 17 are located between the plates 1 and are journaled on the pivot elements 5, the spacer 2 being cut away as at 20 in Figure 3 to accommodate the fraction disks 17. The fraction disks 17 are equipped on their outer surfaces with numerals 18, adapted to be located above and below the partition line 9, to designate a fraction. All of the various disks are supplied with seats or perforations 19, exposed through the various openings 6—7, and adapted to receive a small object of any kind, such as a nail or pencil, whereby rotation may be imparted to the disks.

A glance at Figure 1 will show that the disks 14 and 11 may be rotated so that the numerals 15 and 12 designate a whole number visible through the openings 6, it being possible to rotate the disks 17 so that the numerals 18 thereof, cooperating with the partition line 9 will form a fraction, visible through the openings 7.

I claim:

1. A device of the class described, comprising spaced plates and means for connecting the plates to form a frame, a pivot member connecting the plates, the plates having main openings elongated in the direction of the length of the frame, the main opening of one plate being located on one side of the pivot member, and the main opening of the other plate being located on the other side of the pivot member, each plate being provided with an auxiliary opening disposed between the corresponding main opening and the end of the frame, the auxiliary openings being elongated in the direction of the width of the frame, each plate being supplied on its inner surface with a partition line visible through the auxiliary opening of the other plate; pairs of disks journaled between the plates and provided with numerals, which are visible through the auxiliary openings, each numeral on one disk of each pair cooperating with the partition line to form the denominator of a fraction, and each numeral on the other disk of each pair cooperating with the partition line to form the numerator of a fraction of a unit, and an inner disk journaled on the pivot member, outer disks journaled on the pivot member and located between the inner disk and the plates, the inner disk being of greater diameter than the outer disks, the inner disk being provided on its opposite surfaces with numerals, and the outer surfaces of the outer disks being provided with numerals, the numerals on one surface of the inner disk and the numerals on the outer surface of one outer disk being visible through one of the main openings, and the numerals on the other surface of the inner disk and the numerals on the outer surface of the other outer disk being visible through the other main opening, to denote a number composed of said units.

2. A device of the class described, comprising plates and a spacer therebetween, a pivot member mounted in the plates, each plate having an opening, the openings being located on opposite sides of the pivot member, an inner disk journaled on the pivot member, outer disks journaled on the pivot member and located between the inner disk and the plates, the inner disk being of greater diameter than the outer disks, the inner disk being provided on its opposite surfaces with numerals, and the outer surfaces of the outer disks being provided with numerals, the numerals on one surface of the inner disk and the numerals on the outer surface of one outer disk being visible through one opening, and the numerals on the other surface of the inner disk and the numerals on the outer surface of the other outer disk being visible through the other opening, the plates having outwardly bowed portions which clear the numerals on the disks, the outwardly bowed portions of the plates bearing on the outer disks at their peripheries, the pivot member passing through the outwardly bowed portions of the plates, and being adjustable thereby to bind the disks together in adjusted frictional contact.

In testimony that I claim the foregoing as my own, I have hereto affixed my signature.

FRANKFORD M. COOK.